(12) United States Patent
Sridharan et al.

(10) Patent No.: US 11,036,267 B2
(45) Date of Patent: Jun. 15, 2021

(54) FIELD REPLACEABLE TOUCH DISPLAY MODULE

(71) Applicant: Microsoft Technology Licensing, LLC, Redmond, WA (US)

(72) Inventors: Srilatha Sridharan, Redmond, WA (US); John Schock, Steilacoom, WA (US); Kansu Dincer, Redmond, WA (US); Dennis Mamati Wavomba, Seattle, WA (US); Erng-Sing Wee, Bellevue, WA (US); Dmitry Birenberg, Rosh-Ha-Ayin (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 190 days.

(21) Appl. No.: 16/286,098

(22) Filed: Feb. 26, 2019

(65) Prior Publication Data

US 2020/0272213 A1 Aug. 27, 2020

(51) Int. Cl.
*G06F 1/24* (2006.01)
*G06F 3/041* (2006.01)
*G06F 9/4401* (2018.01)
*G06F 16/28* (2019.01)

(52) U.S. Cl.
CPC .............. *G06F 1/24* (2013.01); *G06F 3/041* (2013.01); *G06F 3/0412* (2013.01); *G06F 3/0418* (2013.01); *G06F 9/4401* (2013.01); *G06F 9/4406* (2013.01); *G06F 16/284* (2019.01)

(58) Field of Classification Search
CPC .......... G06F 1/24; G06F 3/041; G06F 3/0412; G06F 3/0418; G06F 9/4401; G06F 9/4406
See application file for complete search history.

(56) References Cited

U.S. PATENT DOCUMENTS

| 5,283,559 A | 2/1994 | Kalendra et al. |
| 6,708,068 B1 * | 3/2004 | Sakaue ................ B25J 9/08 |
| | | 318/568.11 |
| 8,319,738 B2 | 11/2012 | Taylor |
| 10,366,217 B2 * | 7/2019 | Finzi ................ H04L 9/3234 |
| 2004/0041842 A1 | 3/2004 | Lippincott |
| 2006/0209041 A1 | 9/2006 | Studt et al. |

(Continued)

OTHER PUBLICATIONS

"International Search Report and Written Opinion Issued in PCT Application No. PCT/US20/017406", dated May 7, 2020, 10 Pages.

(Continued)

*Primary Examiner* — Glenn A. Auve
(74) *Attorney, Agent, or Firm* — Holzer Patel Drennan (57) ABSTRACT

In the event of a TDM failure, the associated computing device is either discarded or sent back to an original equipment manufacturer's facility for refurbishment. Field replacement of TDMs is typically not possible due to the lack of a secure process to recalibrate the touch controller to function properly with a replacement TDM. The presently disclosed systems and methods enable secure recalibration of a touch controller within a computing device to operate correctly with a new TDM field installed in the computing device. More specifically, the presently disclosed systems and methods provide a mechanism for detecting that a TDM has been field replaced, unlocking calibration data, performing a calibration process, and locking the new calibration data.

20 Claims, 3 Drawing Sheets

(56) References Cited

U.S. PATENT DOCUMENTS

| | | |
|---|---|---|
| 2008/0282046 A1 | 11/2008 | Yuuki |
| 2011/0154006 A1 | 6/2011 | Natu et al. |
| 2013/0222320 A1* | 8/2013 | Huang .................... G06F 21/71 |
| | | 345/173 |
| 2015/0084900 A1* | 3/2015 | Hodges ................ G06F 1/1632 |
| | | 345/173 |
| 2016/0070414 A1 | 3/2016 | Shukla et al. |
| 2016/0098149 A1* | 4/2016 | Baumgartner .......... G06F 3/041 |
| | | 345/178 |

OTHER PUBLICATIONS

"Controller Calibration on Resistive Touch Screens", Retrieved From: https://web.archive.org/web/20141117214557/https:/www.dmccoltd.com/english/contact_us/faq03.asp, Nov. 17, 2014, 2 Pages.

* cited by examiner

FIELD REPLACEABLE TOUCH DISPLAY MODULE

BACKGROUND

Various computing devices incorporate touch display modules (TDMs), which are controlled by a touch controller. To function properly, each TDM is calibrated to work with the touch controller upon commissioning of the associated computing device. The calibration data specific to the computing device is stored in non-volatile memory on the computing device to be used throughout its life. As the calibration data is not typically changed over time, it is often locked to prevent potential tampering with the computing device.

In the event of a TDM failure, the associated computing device is either discarded or sent back to an original equipment manufacturer's facility for refurbishment. Field replacement of TDMs is typically not possible due to the lack of a secure process to recalibrate the touch controller to function properly with a replacement TDM.

SUMMARY

Implementations described and claimed herein provide a computing device comprising a touch display module (TDM) including a TDM datastore storing a first identification number and a system chassis including a system datastore storing system firmware and a second identification number. The system firmware compares the first identification number to the second identification number, authorizes a TDM calibration process if the first identification number differs from the second identification number, and resets the first identification number equal to the second identification number.

Implementations described and claimed herein further provide a method for field replacing a touch display module (TDM) of a computing device. The method comprises comparing a first identification number stored in a TDM datastore with a second identification number stored in a system datastore, authorizing a TDM calibration process if the first identification number differs from the second identification number, and resetting the first identification number equal to the second identification number.

Implementations described and claimed herein still further provide one or more computer-readable storage media encoding computer-executable instructions for executing on a computer system a computer process for field replacing a touch display module (TDM) of a computing device. The computer process comprises comparing a first identification number stored in a TDM datastore with a second identification number stored in a system datastore, authorizing a TDM calibration process if the first identification number differs from the second identification number, and resetting the first identification number equal to the second identification number.

Other implementations are also described and recited herein. This Summary is provided to introduce a selection of concepts in a simplified form that are further described below in the Detailed Descriptions. This Summary is not intended to identify key features or essential features of the claimed subject matter, nor is it intended to be used to limit the scope of the claimed subject matter.

DETAILED DESCRIPTIONS

The presently disclosed systems and methods enable secure recalibration of a touch controller within a computing device to operate correctly with a new touch display module (TDM) field installed in the computing device. More specifically, the presently disclosed systems and methods provide a mechanism for detecting that a TDM has been field replaced, unlocking calibration data, performing a calibration process, and locking the new calibration data.

Figure 1:
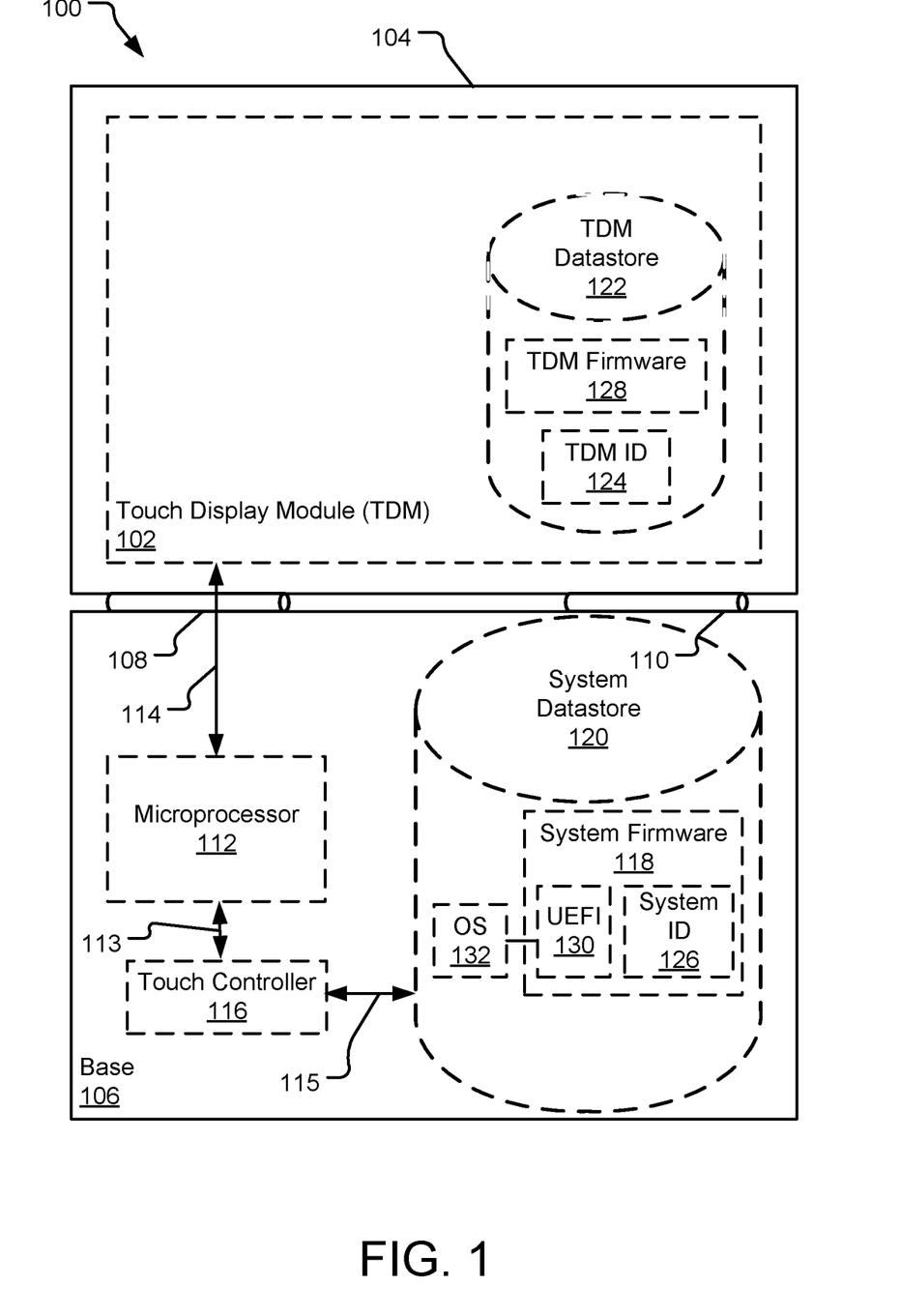
FIG. 1 illustrates a computing device including an example field replaceable touch display module.

FIG. 1 illustrates a computing device 100 including an example field replaceable touch display module (TDM) 102. The computing device 100 includes a display 104 pivotally connected to a base 106 via hinges 108, 110. As a result, a user may position the display 104 at a variety of angles with respect to the base 106 to achieve a desired viewing angle to the display 104, or for other user considerations. In various implementations, a combination of the base 106 and the display 104 minus the TDM 102 may be referred to herein as a system chassis. Further, the display 104 may be selectively separable from the base 106.

The computing device 100 may be a laptop computer or another type of computing device, including but not limited to mobile computing devices and desktop computing devices (e.g., personal computers, gaming devices, smart phones, smart TVs, or other devices that carry out one or more specific sets of arithmetic and/or logical operations). Further, while the display 104 and the base 106 are illustrated, and discussed in detail herein, the computing device 100 may include any number of components (e.g., a keyboard, a display screen, a touchscreen, a touchpad, a kickstand, a screen cover, and combinations thereof) including one or more TDMs. For example, another computing device may be a 2-screen device having a pair of TDMs and the hinges 108, 110 may permit the 2-screen computing device to lay flat in an open configuration (as illustrated) or folded such that each of the two screens are outwardly-facing or inwardly-facing. In FIG. 1, internal components to the computing device 100 are shown in dashed lines and described as follows.

The TDM 102 is physically mounted within the display 104 and includes a touch-sensitive display screen and associated microelectronic components adhered to an interior-side of the TDM 102 to enable its function. The TDM 102 also includes TDM datastore 122, which stores (or has the capability of storing) a TDM identification number (ID) 124 (or first ID), which may be unique to the TDM 102. The TDM datastore 122 may include one or more of a variety of non-volatile storage media (e.g., read-only memory, flash memory, ferroelectric RAM, hard disk drives, solid state drives, and other magnetic or optical media). In one example implementation, the TDM datastore 122 is electrically erasable programmable read-only memory (EEPROM) that contains TDM firmware 128 for basic functionality of the TDM 102, as well as the TDM ID 124. In some implementations, the TDM datastore 122 includes multiple separate media that store the TDM firmware 128 and the TDM ID 124.

The TDM 102 is communicatively coupled to a microprocessor 112 (e.g., a system-on-ship (SOC)), as illustrated by arrow 114. Amongst other features of the computing device 100, the microprocessor 112 runs a touch controller 116 (as illustrated by arrow 113) and system firmware 118 stored on a system datastore 120 (as illustrated by arrow 115). The touch controller 116 operates touch functionality of the TDM 102 as a component of the computing device 100. Additional functionalities of the TDM 102 may be handled by additional controllers (e.g., a timing controller, not shown). The system datastore 120 also stores (or has the capability of storing) a second identification number (ID) 126, which may be unique to the touch controller 116, the base 106, or the system chassis overall.

In one example implementation, the system firmware 118 utilizes a unified extensible firmware interface (UEFI) (or basic input/output system (BIOS)) 130 to communicate and interface with a system operating system (OS) 132, both of which are also stored within the system datastore 120. The UEFI 130, which executes on the microprocessor 112, has access to the system ID 126 and has the capability to compare the system ID 126 to the TDM ID 124, change one or both of the system ID 126 to the TDM ID 124 to match, and unlock a TDM calibration process and associated calibration data. In some implementations, the UEFI 130 also has the capability to run the TDM calibration process itself and store new calibration data within the system datastore 120.

The system datastore 120 may include one or more of a variety of non-volatile storage media (e.g., read-only memory, flash memory, ferroelectric RAM, hard disk drives, solid state drives, and other magnetic or optical media). In one example implementation, the OSS 132 is stored on a first storage media (e.g., a hard disk drive). The system firmware 118, which includes the UEFI 130 and the system ID 126, is stored on a second storage media (e.g., dedicated flash memory). Firmware for the touch controller 116 is stored on a third storage media (e.g., another flash memory physically separate from the system firmware 118 flash memory).

In various implementations, the microprocessor 112 may include one or more processor units (e.g., discrete or integrated microelectronic chips and/or separate but integrated processor cores, including but not limited to central processing units (CPUs) and graphic processing units (GPUs)). The system datastore 120 and the TDM datastore 122 may include one or both of volatile memory (e.g., random-access memory (RAM)) and non-volatile memory (e.g., flash memory and magnetic storage). The OS 132, such as one of the varieties of the Microsoft Windows® operating system, resides in the system datastore 120 and is executed by the microprocessor 112, although other operating systems may be employed. Additional applications (in software and/or firmware) may be loaded in the system datastore 120 and/or the TDM datastore 122 and executed within the OS 132 by the microprocessor 112. In various implementations, the computing device 100 may also include additional storage media device(s) (e.g., a flash or hard disk drive), one or more additional display(s), and other input/output devices.

The computing device 100 may include a variety of tangible computer-readable storage media (e.g., the system datastore 120 and the TDM datastore 122) and intangible computer-readable communication signals. Tangible computer-readable storage can be embodied by any available media that can be accessed by the computing device 100 and includes both volatile and non-volatile storage media, as well as removable and non-removable storage media implemented in any method or technology for storage of information such as computer readable instructions, data structures, program modules or other data. Tangible computer-readable storage media includes, but is not limited to, RAM, read-only memory (ROM), electrically erasable programmable read-only memory (EEPROM), flash memory or other memory technology, compact disc read-only memory (CD-ROM), digital versatile disks (DVD) or other optical storage, magnetic cassettes, magnetic tape, magnetic disk storage or other magnetic storage, or any other tangible medium which can be used to store the desired information and which can be accessed by the computing device 100. Computer-readable storage media as contemplated herein excludes intangible communications signals.

Intangible computer-readable communication signals may embody computer readable instructions, data structures, program modules or other data resident in a modulated data signal, such as a carrier wave or other signal transport mechanism. The term "modulated data signal" means a signal that has one or more of its characteristics set or changed in such a manner as to encode information in the signal. By way of example, and not limitation, intangible communication signals include signals traveling through wired media such as a wired network or direct-wired connection, and wireless media such as acoustic, radio-frequency (RF), infrared (IR), and other wireless media.

Some implementations of the presently disclosed technology may comprise an article of manufacture that includes a tangible storage medium to store logic. Examples of the tangible storage medium may include one or more types of computer-readable storage media capable of storing electronic data, including volatile or non-volatile memory, removable or non-removable memory, erasable or non-erasable memory, writeable or re-writeable memory, and so forth. Examples of the logic may include various software elements, such as software components, programs, applications, computer programs, application programs, system programs, machine programs, operating system software, middleware, firmware, software modules, routines, subroutines, operation segments, methods, procedures, software interfaces, application program interfaces (APIs), instruction sets, computing code, computer code, code segments, computer code segments, words, values, symbols, or any combination thereof. In one implementation, for example, an article of manufacture may store executable computer program instructions that, when executed by a computer, cause the computer to perform methods and/or operations in accordance with the described implementations. The executable computer program instructions may include any suitable type of code, such as source code, compiled code, interpreted code, executable code, static code, dynamic code, and the like. The executable computer program instructions may be implemented according to a predefined computer language, manner, or syntax, for instructing a computer to perform a certain operation segment. The instructions may be implemented using any suitable high-level, low-level, object-oriented, visual, compiled, and/or interpreted programming language.

Figure 2:
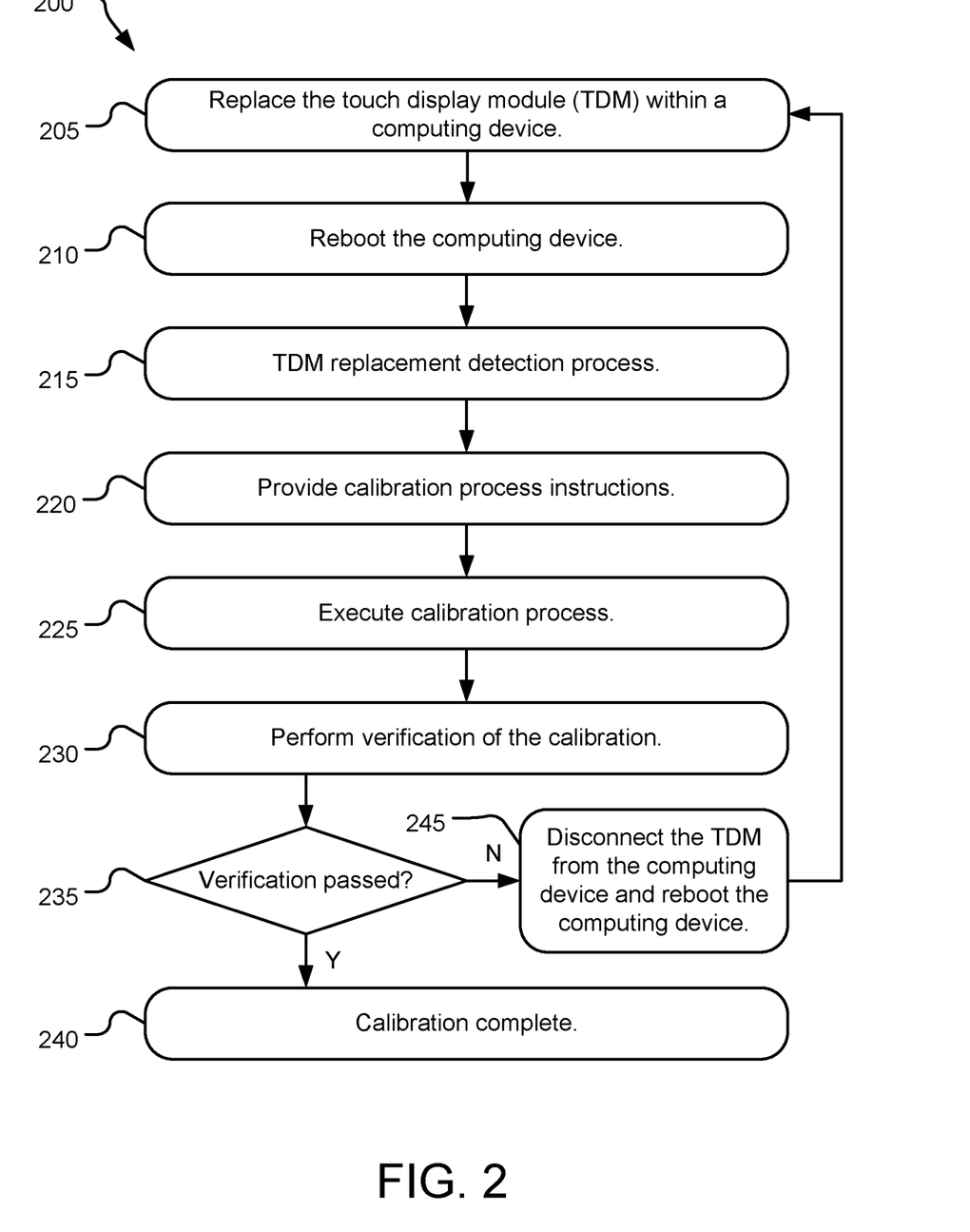
FIG. 2 illustrates example operations for field replacing a touch display module.

FIG. 2 illustrates example operations 200 for field replacing a touch display module (TDM). A replacement operation 205 replaces the TDM within a computing device. In various implementations, a qualified technician (or the end user) physically removes a broken or otherwise defective TDM from an otherwise functional computing device and replaces the TDM with a new (or refurbished) TDM for future use within the computing device. Following physical replacement of the TDM, the technician initiates rebooting operation 210 on the computing device.

During the rebooting operation 210, a UEFI executing on a system microprocessor executes a TDM replacement detection process 215, which is described in further detail below with reference to FIG. 3. Following a successful TDM replacement detection process 215, TDM calibration data is unlocked for the remainder of the current boot cycle. The UEFI hands off to the system operating system, which provides instructions 220 to the technician regarding the calibration process. Specifically, the OS (or a calibration application running within the OS) may instruct the technician to avoid physical contact with the computing device touchscreen during the calibration process. The OS (or the calibration application) may also give the technician the option whether or not to proceed with the calibration process or reboot the computing device.

Once the instructions have been provided, the OS (or the calibration application) either automatically (or with input from the technician) executes a calibration process 225 on the newly replaced TDM. The calibration process 225 generates and stores calibration data that enables a touch controller to accurately and consistently control the TDM and interpret a user's physical contact with the TDM. A verification process 230 verifies the success and accuracy of the calibration process 225. Decision operation 235 determines if the calibration process 225 was successful per the verification process 230. If so, the calibration is considered complete 240. In various implementations, the OS may automatically reboot the computing system or query the technician to authorize a reboot. In other implementations, the OS will continue with normal operation without a subsequent reboot. Upon a successful reboot, the calibration data is locked from further change.

If the decision operation 235 determines that the calibration process 225 was unsuccessful per the verification process 230, the technician is instructed to disconnect the new TDM from the computing device and reboot the computing device per operation 245. The reboot without a connected TDM will ensure a mismatch between a TDM ID number and a system ID number (for example, by clearing the system ID number). As such, the user may subsequently replace the TDM with the same or a different TDM, as previously described in replacing operation 205. The remainder of operations 200 repeat in an attempt to successfully calibrate the new TDM.

Figure 3:
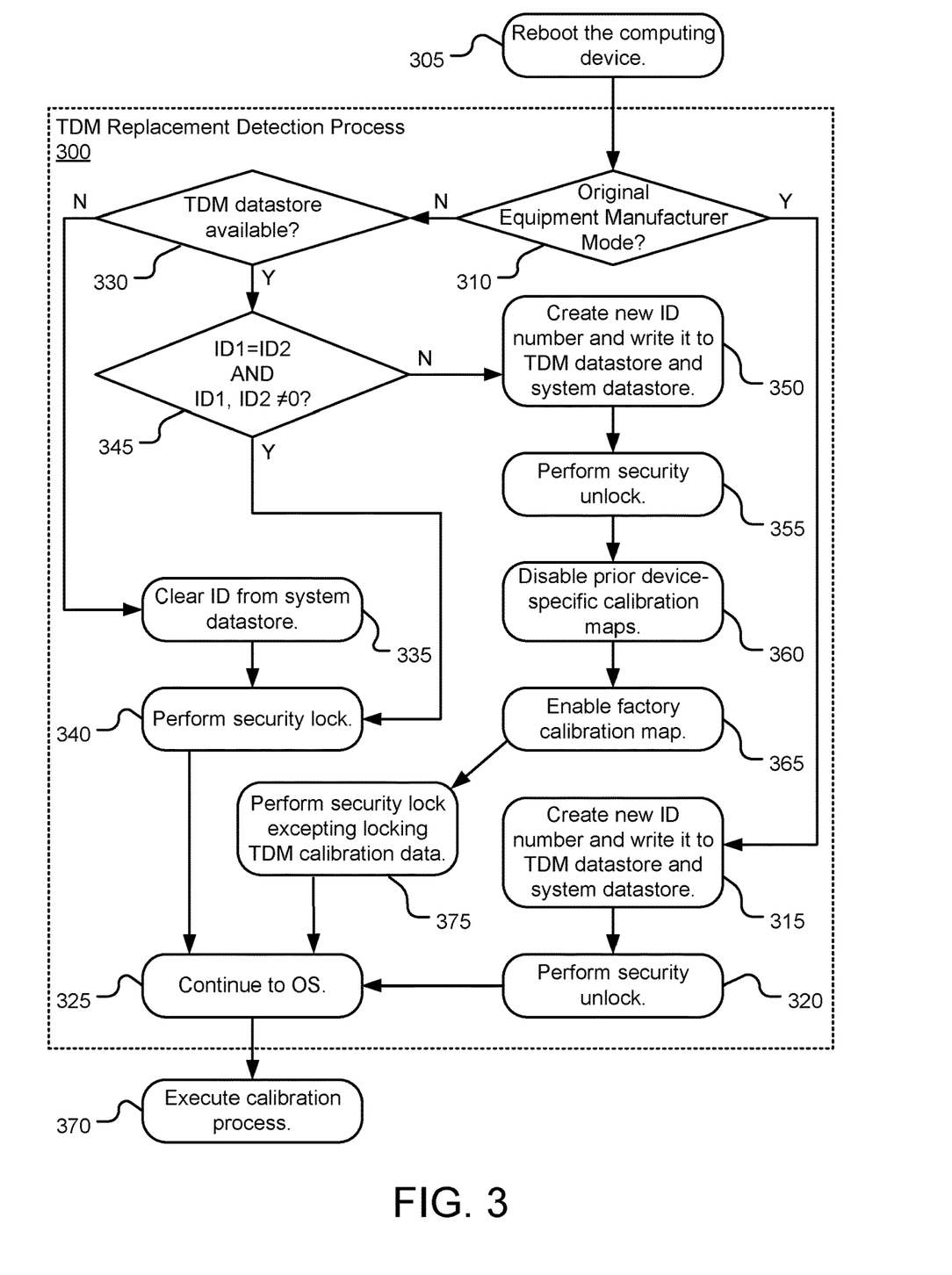
FIG. 3 illustrates example operations for performing a touch display module replacement detection process.

FIG. 3 illustrates example operations for performing a touch display module replacement detection process 300. Rebooting operation 305 reboots a computing device with a newly field-replaced TDM. In an example implementation, the TDM replacement detection process 300 is performed by the computing device UEFI executing on a system microprocessor during the device boot cycle, as indicated in brief above with reference to TDM replacement detection process 215 of FIG. 2. In other implementations, the TDM replacement detection process 300 may performed by any software or firmware executing on the system microprocessor.

Decision operation 310 determines if the computing device is booted in a secure "manufacturing mode," which indicates that the computing device is under the control of an original equipment manufacturer, or another party entrusted with a similarly high level of access. In many instances, the "manufacturing mode" indicates that the computing device is connected at the original equipment manufacturer's facility. If so, in a creating operation 315, the UEFI creates a cryptographically secure random number and writes it to both of a TDM datastore and a system datastore as identification of a matched pair. In other implementations, the UEFI uses a serial number previously assigned to the TDM and writes that number to both of the TDM datastore and the system datastore as identification of the matched pair. In some implementations, the creating operation 315 is only performed if a first identification number (or a TDM identification number) stored within the TDM datastore matches a second identification number (or a system identification number) stored within the system datastore, or if either of the first identification number and the second identification number are non-zero values (see e.g., decision operation 345 below).

Following the creating operation 315, the UEFI performs a general security unlock 320. As the computing device is at the original equipment manufacturer's facility, the general security unlock is authorized and permitted to proceed to the OS in an unlocked state. In continuing operation 325, the UEFI permits the boot cycle to continue to the computing device operating system where a factory calibration process 370 may be performed and verified.

If the decision operation 310 determines that the computing device is not connected in the secure "manufacturing mode," decision operation 330 determines if a TDM datastore is available to the UEFI. If not, the TDM is not present, not usable, or incorrectly connected. In clearing operation 335, the UEFI clears the system ID stored in the system datastore as it is no longer associated with a connected TDM, replacing it with a series of "0" values or an otherwise null value. In locking operation 340, the UEFI performs the typical security locks, including but not limited to locking TDM calibration data stored within the system datastore. In the continuing operation 325, the UEFI permits the boot cycle to continue to the computing device operating system. As the TDM was not present or appropriately connected, the operating system may not proceed with the calibration process 370 during the present boot cycle. In various implementations, the OS may inform a technician that the TDM is not present and offer an option for rebooting the computing device after verifying the presence and physical connections for the TDM. In other implementations, the OS may automatically reboot the computing device to re-attempt the touch display module replacement detection process 300.

If the decision operation 330 determines that a TDM datastore is available to the UEFI, decision operation 345 determines if a first identification number (or a TDM identification number) stored within the TDM datastore matches a second identification number (or a system identification number) stored within the system datastore. Stated differently, the decision operation 345 compares a first identification number stored in a TDM datastore with a second identification number stored in a system datastore to determine if a match is present. The decision operation 345 may also determine if either of the first identification number and the second identification number are non-zero values. In some implementations, the decision operation 345 may only check one of the first identification number and the second identification number for a non-zero value.

If both the first identification number and the second identification number are non-zero values and are matching, in locking operation 340, the UEFI performs the typical security locks, including but not limited to locking TDM calibration data stored within the system datastore. In the continuing operation 325, the UEFI permits the boot cycle to continue to the computing device operating system. As both the first identification number and the second identification number are non-zero values and are equal, no further calibration process is required.

If one or both of the first identification number and the second identification number are zero values or are non-matching, in creating operation 350, the UEFI creates a cryptographically secure random number and writes it to both of the TDM datastore and the system datastore as identification of a matched pair. In other implementations, the UEFI uses a serial number previously assigned to the TDM and writes that number to both of the TDM datastore and the system datastore as identification of the matched pair. Stated differently, the creating operation 350 resets the first identification number equal to the second identification number. Following the creating operation 350, the UEFI performs a general security unlock 355. Stated differently, the general security unlock 355 authorizes a subsequent TDM calibration process if the first identification number differs from the second identification number and the first identification number is a non-zero value.

A disabling operation 360 disables any prior TDM calibration maps that are specific to the computing device. An enabling operation 365 enables a factory calibration map to allow the TDM to partially function pending completion of a calibration process. In locking operation 375, the UEFI performs the typical security locks, excepting locking TDM calibration data stored within the system datastore. In the continuing operation 325, the UEFI permits the boot cycle to continue to the computing device operating system where the calibration process 370 is performed on the newly connected TDM and replaces the factory calibration map with new calibration data, as described above with reference to FIG. 2.

In various implementations, the operations 300 may iteratively and automatically repeat upon each subsequent boot of the computing device to verify that the connected TDM has been previously calibrated and if a new TDM is connected, that it is successfully calibrated in subsequent OS operations.

Some embodiments of the invention described herein are implemented as logical steps in one or more computer systems. The logical operations are implemented (1) as a sequence of processor-implemented steps executing in one or more computer systems and (2) as interconnected machine or circuit modules within one or more computer systems. The implementation is a matter of choice, dependent on the performance requirements of the computer system implementing the invention. Accordingly, the logical operations described herein are referred to variously as operations, steps, objects, or modules. Furthermore, the logical operations may be performed in any order, adding or omitting operations as desired, unless explicitly claimed otherwise or a specific order is inherently necessitated by the claim language.

An example computing device according to the presently disclosed technology comprises a touch display module (TDM) including a TDM datastore storing a first identification number and a system chassis including a system datastore storing system firmware and a second identification number. The system firmware compares the first identification number to the second identification number, authorizes a TDM calibration process if the first identification number differs from the second identification number, and resets the first identification number equal to the second identification number.

In another example computing device according to the presently disclosed technology, the system datastore further stores an operating system. Authorizing the TDM calibration process includes unlocking TDM calibration data via the system firmware and executing the TDM calibration process via the operating system during a subsequent boot of the operating system.

In another example computing device according to the presently disclosed technology, authorizing the TDM calibration process includes executing the TDM calibration process via the system firmware.

In another example computing device according to the presently disclosed technology, the system firmware authorizes the TDM calibration process if one or both of the first identification number and the second identification number have a null value.

In another example computing device according to the presently disclosed technology, the system firmware assigns one of the first identification number and the second identification number a cryptographically secure random number and resets the other of the first identification number and the second identification number to a matching value.

In another example computing device according to the presently disclosed technology, one of the TDM and the system chassis includes a serial number to be used as one of the first identification number and the second identification number and the system firmware resets the other of the first identification number and the second identification number to a matching value.

In another example computing device according to the presently disclosed technology, the first identification number is unique to the TDM.

In another example computing device according to the presently disclosed technology, the system datastore further stores a touch controller and the TDM calibration process creates calibration data that enables the touch controller to accurately control the TDM touch functionality.

An example method for field replacing a touch display module (TDM) of a computing device accordingly to the presently disclosed technology comprises comparing a first identification number stored in a TDM datastore with a second identification number stored in a system datastore, authorizing a TDM calibration process if the first identification number differs from the second identification number, and resetting the first identification number equal to the second identification number.

In another example method according to the presently disclosed technology, the system datastore further stores an operating system, and wherein authorizing the TDM calibration process includes unlocking TDM calibration data via system firmware, and executing the TDM calibration process via the operating system during a subsequent boot of the operating system.

In another example method according to the presently disclosed technology, authorizing the TDM calibration process includes executing the TDM calibration process via system firmware.

Another example method according to the presently disclosed technology further comprises authorizing the TDM calibration process if one or both of the first identification number and the second identification number have a null value.

In another example method according to the presently disclosed technology, resetting the first identification number equal to the second identification number includes assigning one of the first identification number and the second identification number a cryptographically secure random number and resetting the other of the first identification number and the second identification number to a matching value.

In another example method according to the presently disclosed technology, one of the TDM and a system chassis includes a serial number to be used as one of the first identification number and the second identification number, and wherein resetting the first identification number equal to the second identification number includes setting the other of the first identification number and the second identification number to a matching value.

In another example method according to the presently disclosed technology, the first identification number is unique to the TDM.

In another example method according to the presently disclosed technology, the system datastore further stores a touch controller and the TDM calibration process creates calibration data that enables the touch controller to accurately control the TDM.

One or more example computer-readable storage media encodes computer-executable instructions for executing on a computer system a computer process for field replacing a touch display module (TDM) of a computing device according to the presently disclosed technology. The computer process comprises comparing a first identification number stored in a TDM datastore with a second identification number stored in a system datastore, authorizing a TDM calibration process if the first identification number differs from the second identification number, and resetting the first identification number equal to the second identification number.

In another computer-readable storage media according to the presently disclosed technology, the system datastore further stores an operating system, and wherein authorizing the TDM calibration process includes unlocking TDM calibration data via system firmware, and executing the TDM calibration process via the operating system during a subsequent boot of the operating system.

In another computer-readable storage media according to the presently disclosed technology, authorizing the TDM calibration process includes executing the TDM calibration process via system firmware.

In another computer-readable storage media according to the presently disclosed technology, the computer process further comprises authorizing the TDM calibration process if one or both of the first identification number and the second identification number have a null value.

The above specification, examples, and data provide a complete description of the structure and use of exemplary embodiments of the invention. Since many embodiments of the invention can be made without departing from the spirit and scope of the invention, the invention resides in the claims hereinafter appended. Furthermore, structural features of the different embodiments may be combined in yet another embodiment without departing from the recited claims.

What is claimed is:

1. A computing device comprising:
   a touch display module (TDM) including a TDM datastore storing a first identification number specific to the TDM; and
   a system chassis including a system datastore storing system firmware and a second identification number, the system firmware to compare the first identification number to the second identification number, authorize a TDM calibration process if the first identification number differs from the second identification number, and reset the second identification number equal to the first identification number in response to a successful calibration of the TDM.

2. The computing device of claim 1, wherein the system datastore further stores an operating system, wherein authorizing the TDM calibration process includes:
   unlocking TDM calibration data via the system firmware; and
   executing the TDM calibration process via the operating system during a subsequent boot of the operating system.

3. The computing device of claim 1, wherein authorizing the TDM calibration process includes executing the TDM calibration process via the system firmware.

4. The computing device of claim 1, wherein the system firmware authorizes the TDM calibration process if one or both of the first identification number and the second identification number have a null value.

5. The computing device of claim 1, wherein the system firmware assigns the first identification number a cryptographically secure random number and resets the second identification number to a matching value.

6. The computing device of claim 1, wherein the TDM includes a serial number to be used as the first identification number and the system firmware resets the second identification number to a matching value.

7. The computing device of claim 1, wherein the first identification number is unique to the TDM.

8. The computing device of claim 1, wherein the TDM calibration process creates calibration data that enables a touch controller to accurately control TDM touch functionality.

9. A method for field replacing a touch display module (TDM) of a computing device comprising:
   comparing a first identification number specific to the TDM and stored in a TDM datastore with a second identification number stored in a system datastore;
   authorizing a TDM calibration process if the first identification number differs from the second identification number; and
   resetting the second identification number equal to the first identification number in response to a successful calibration of the TDM.

10. The method of claim 9, wherein the system datastore further stores an operating system, and wherein authorizing the TDM calibration process includes:
    unlocking TDM calibration data via system firmware; and
    executing the TDM calibration process via the operating system during a subsequent boot of the operating system.

11. The method of claim 9, wherein authorizing the TDM calibration process includes executing the TDM calibration process via system firmware.

12. The method of claim 9, further comprising:
    authorizing the TDM calibration process if one or both of the first identification number and the second identification number have a null value.

13. The method of claim 9, wherein resetting the second identification number equal to the first identification number includes assigning the first identification number a cryptographically secure random number and resetting the second identification number to a matching value.

14. The method of claim 9, wherein the TDM includes a serial number to be used as one of the first identification number, and wherein resetting the second identification number equal to the first identification number includes setting the second identification number to a matching value.

15. The method of claim 9, wherein the first identification number is unique to the TDM.

16. The method of claim 9, wherein the TDM calibration process creates calibration data that enables a touch controller to accurately control the TDM.

17. One or more computer-readable storage media encoding computer-executable instructions for executing on a computer system a computer process for field replacing a touch display module (TDM) of a computing device, the computer process comprising:

comparing a first identification number specific to the TDM and stored in a TDM datastore with a second identification number stored in a system datastore;

authorizing a TDM calibration process if the first identification number differs from the second identification number; and resetting the second identification number equal to the first identification number in response to a successful calibration of the TDM.

18. The computer-readable storage media of claim 17, wherein the system datastore further stores an operating system, and wherein authorizing the TDM calibration process includes:

unlocking TDM calibration data via system firmware; and executing the TDM calibration process via the operating system during a subsequent boot of the operating system.

19. The computer-readable storage media of claim 17, wherein authorizing the TDM calibration process includes executing the TDM calibration process via system firmware.

20. The computer-readable storage media of claim 17, the computer process further comprising:

authorizing the TDM calibration process if one or both of the first identification number and the second identification number have a null value.

* * * * *